US012785545B2

(12) United States Patent
Hu et al.

(10) Patent No.: US 12,785,545 B2
(45) Date of Patent: Nov. 3, 2026

(54) THREE-PHASE POWER SUPPLY CONVERSION CIRCUIT FOR HOUSEHOLD APPLIANCE, HOUSEHOLD APPLIANCE, AND POWER-ON CONTROL METHOD

(71) Applicants: FOSHAN SHUNDE MIDEA ELECTRIC SCIENCE AND TECHNOLOGY CO., LTD., Foshan (CN); GD MIDEA AIR-CONDITIONING EQUIPMENT CO., LTD., Foshan (CN)

(72) Inventors: Bin Hu, Foshan (CN); Tan Long, Foshan (CN); Hongming Zhou, Foshan (CN); Zhaobin Huang, Foshan (CN); Wenkai Zhang, Foshan (CN); Xiaojun Yan, Foshan (CN); Jienan Zhang, Foshan (CN); Dong Wei, Foshan (CN); Ran Bi, Foshan (CN); Yunsong Xu, Foshan (CN)

(73) Assignees: FOSHAN SHUNDE MIDEA ELECTRIC SCIENCE AND TECHNOLOGY CO., LTD., Foshan (CN); GD MIDEA AIR-CONDITIONING EQUIPMENT CO., LTD., Foshan (CN)

( * ) Notice: Subject to any disclaimer, the term of this patent is extended or adjusted under 35 U.S.C. 154(b) by 99 days.

(21) Appl. No.: 19/000,866

(22) Filed: Dec. 24, 2024

(65) Prior Publication Data

US 2025/0132663 A1 Apr. 24, 2025

Related U.S. Application Data

(63) Continuation of application No. PCT/CN2023/102826, filed on Jun. 27, 2023.

(30) Foreign Application Priority Data

Jun. 29, 2022 (CN) ......................... 202210764677.7

(51) Int. Cl.
*H02M 7/28* (2006.01)
*H02M 1/00* (2006.01)
(Continued)

(52) U.S. Cl.
CPC ............. *H02M 1/32* (2013.01); *H02M 1/009* (2021.05); *H02M 1/14* (2013.01); *H02M 1/36* (2013.01);
(Continued)

(58) Field of Classification Search
CPC ........ H02M 1/32; H02M 1/322; H02M 1/009; H02M 1/0083; H02M 1/0087; H02M 1/02;
(Continued)

(56) References Cited

U.S. PATENT DOCUMENTS

2007/0241616 A1* 10/2007 Lai ........................ H02M 5/458 307/66
2010/0246127 A1* 9/2010 Liu ..................... F28D 15/0233 29/428
2022/0337153 A1* 10/2022 Lee ........................ H02M 1/10

FOREIGN PATENT DOCUMENTS

CN 105186845 A 12/2015
CN 206041839 U 3/2017
(Continued)

OTHER PUBLICATIONS

Extended European search report dated Jun. 25, 2025 received in European Patent Application No. 23830259.0.
(Continued)

*Primary Examiner* — Nguyen Tran
(74) *Attorney, Agent, or Firm* — Scully, Scott, Murphy & Presser, P.C.

(57) ABSTRACT

Provided are a three-phase power conversion circuit for a household electrical appliance, a household electrical appliance, and a power-on control method for a household electrical appliance. The three-phase power conversion circuit includes a three-level active PFC unit, at least two power-on units, and a control unit. The three-phase power, subsequent to being converted by the three-level active PFC unit, obtains a first DC power and a second DC power to supply power to corresponding loads. The power-on unit is arranged at input terminals of the three-level active PFC unit to buffer a device in the three-level active PFC unit when the three-level active PFC unit is powered on. A first controllable switch module and a second controllable switch module in the power-on unit and the three-level active PFC unit are controlled by the control unit to complete buffering.

17 Claims, 4 Drawing Sheets

(51) Int. Cl.

| | |
|---|---|
| ***H02M 1/14*** | (2006.01) |
| ***H02M 1/32*** | (2007.01) |
| ***H02M 1/36*** | (2007.01) |
| ***H02M 1/42*** | (2007.01) |
| ***H02M 7/219*** | (2006.01) |

(52) U.S. Cl.

CPC ....... *H02M 1/4233* (2013.01); *H02M 1/4266* (2013.01); *H02M 7/219* (2013.01); *H02M 7/28* (2013.01)

(58) Field of Classification Search

CPC ............ H02M 1/14; H02M 1/15; H02M 1/16; H02M 1/4233; H02M 1/425; H02M 1/4258; H02M 1/4266; H02M 7/219; H02M 7/25; H02M 7/217; H02M 7/2176; H02M 7/28

See application file for complete search history.

(56) References Cited

FOREIGN PATENT DOCUMENTS

| | | | |
|---|---|---|---|
| CN | 212305171 | U | 1/2021 |
| CN | 113394990 | A | 9/2021 |
| CN | 114051689 | A | 2/2022 |
| CN | 114337332 | A | 4/2022 |
| EP | 0 660 498 | A2 | 6/1995 |
| EP | 1511152 | A1 | 3/2005 |
| EP | 1511152 | B1 | 6/2007 |
| EP | 4178098 | A1 | 5/2023 |
| EP | 4239872 | A1 | 9/2023 |
| EP | 4318906 | A1 | 2/2024 |
| JP | H09205740 | A | 8/1997 |
| WO | 2022068566 | A1 | 4/2022 |
| WO | 2022100225 | A1 | 5/2022 |

OTHER PUBLICATIONS

Tafti, H. et al., "Control of active front-end rectifier of the solid-state transformer with improved dynamic performance during precharging", 2017 Asian Conference on Energy, Power and Transportation Electrification (ACEPT), IEEE, 2017, pp. 1-6.

International Search Report dated Aug. 23, 2023 received in International Application No. PCT/CN2023/102826, together with an English-language translation.

Written Opinion dated Aug. 23, 2023 received in International Application No. PCT/CN2023/102826, together with an English-language translation.

Office Action dated Apr. 30, 2026 received in Chinese Patent Application No. 202210764677.7.

Office Action dated Apr. 15, 2026 received in European Patent Application No. 23830259.0.

* cited by examiner

THREE-PHASE POWER SUPPLY CONVERSION CIRCUIT FOR HOUSEHOLD APPLIANCE, HOUSEHOLD APPLIANCE, AND POWER-ON CONTROL METHOD

CROSS-REFERENCE TO RELATED APPLICATIONS

This application is a continuation application of International Application No. PCT/CN2023/102826 filed on Jun. 27, 2023, which claims priority to Chinese Patent Application No. 202210764677.7, filed on Jun. 29, 2022 and entitled "THREE-PHASE POWER CONVERSION CIRCUIT FOR HOUSEHOLD ELECTRICAL APPLIANCE, HOUSEHOLD ELECTRICAL APPLIANCE, AND POWER-ON CONTROL METHOD", the entire contents of each of which are incorporated herein by reference for all purposes. No new matter has been introduced.

FIELD

The present disclosure relates to the field of household electrical appliance control technologies, and more particularly, to a three-phase power conversion circuit for a household electrical appliance, a household electrical appliance, and a power-on control method.

BACKGROUND

With the development of the power grid, three-phase power is applied more frequently, and the application of the three-phase power is becoming safer.

In the use of the three-phase power, the equipment is generally required to adapt to an effective value range of three-phase voltage from 135 V to 264 V, then a voltage of a high-voltage direct current bus may reach 620 V even if the voltage is not boosted, and a withstand voltage of a single electrolytic capacitor is generally 450 V. If a power device in a rectifier circuit is short-circuited, it will directly result in overvoltage damage to the electrolytic capacitor when the equipment is powered on, and even fire will occur under certain serious circumstances, which jeopardizes the safety of a user and safety of the property of the user.

SUMMARY

The present disclosure aims to at least solve one of the technical problems in the related art. To this end, an objective of the present disclosure is to provide a three-phase power conversion circuit for a household electrical appliance, which can improve operation safety of the circuit and prevent a device in the circuit from being damaged due to overvoltage, thereby further prolonging service life of the circuit.

A second objective of the present disclosure is to provide a household electrical appliance.

A third objective of the present disclosure is to provide a power-on control method for a household electrical appliance.

To achieve the above objectives, the three-phase power conversion circuit for the household electrical appliance is provided. The circuit includes: a three-level active Power Factor Correction (PFC) unit configured to convert an inputted three-phase power to output a first Direct Current (DC) power and a second DC power through a full bus and a half bus, the first DC power being configured to supply power to a first load of the household electrical appliance, and the second DC power being configured to supply power to a second load of the household electrical appliance; at least two power-on units arranged corresponding to three-phase input terminals of the three-level active PFC unit, each of the at least two power-on units including a first controllable switch module and a second controllable switch module connected in parallel, and the first controllable switch module including a first controllable switch; a control unit configured to: control, when the three-phase power is inputted to the three-phase power conversion circuit, the first controllable switch to be turned on, and control the three-level active PFC unit to perform conversion; control, subsequent to a first predetermined duration, the second controllable switch module to be turned on; and control, subsequent to a second predetermined duration, the first controllable switch to be turned off to complete power-on of the household electrical appliance.

The three-phase power conversion circuit according to the embodiments of the present disclosure includes the three-level active PFC unit, at least two power-on units, and the control unit. The first DC power and the second DC power can be obtained subsequent to the three-phase power being converted by the three-level active PFC unit, to supply power to a corresponding load. The input terminals of the three-level active PFC unit are further provided with at least two power-on units to buffer devices in the three-level active PFC unit when the three-level active PFC unit is powered on. In particular, the first controllable switch modules and the second controllable switch modules in the at least two power-on units and the three-level active PFC unit may be controlled by the control unit to complete buffering, thereby preventing the devices from being damaged caused by an instantaneous high voltage. Thus, the three-phase power conversion circuit of this embodiment can improve the operation safety of the circuit and prevent the device in the circuit from being damaged due to overvoltage, thereby further prolonging the service life of the circuit.

In some embodiments of the present disclosure, the second controllable switch module includes a second controllable switch. The first controllable switch and the second controllable switch are each a relay.

In some embodiments of the present disclosure, the first controllable switch module further includes a protection resistor connected in series to the first controllable switch and the protection resistor includes a PTC resistor.

In some embodiments of the present disclosure, the at least two power-on units include a first power-on unit and a second power-on unit. The first power-on unit and the second power-on unit are respectively connected in series between any two-phase power of the three-phase power and corresponding two-phase input terminals of the three-phase input terminals.

In some embodiments of the present disclosure, the three-level active PFC unit includes: a first inductor, a second inductor, and a third inductor, one terminal of the first inductor, one terminal of the second inductor, and one terminal of the third inductor serving as the three-phase input terminals respectively; a three-phase rectifier bridge having a first input terminal connected to another terminal of the first inductor, a second input terminal connected to another terminal of the second inductor, and a third input terminal connected to another terminal of the third inductor; a first power module, a second power module, and a third power module, one terminal of the first power module being connected to the first input terminal of the three-phase rectifier bridge, one terminal of the second power module being connected to the second input terminal of the three-phase rectifier bridge, one terminal of the third power module being connected to the third input terminal of the three-phase rectifier bridge, and another terminal of the first power module, another terminal of the second power module, and another terminal of the third power module being connected to form a first node; a first electrolytic capacitor and a second electrolytic capacitor, a positive terminal of the first electrolytic capacitor being connected to a first output terminal of the three-phase rectifier bridge, a negative terminal of the first electrolytic capacitor being connected to a positive terminal of the second electrolytic capacitor to form a second node connected to the first node, and a negative terminal of the second electrolytic capacitor being connected to a second output terminal of the three-phase rectifier bridge.

In some embodiments of the present disclosure, the first load is connected between the positive terminal of the first electrolytic capacitor and the negative terminal of the second electrolytic capacitor. The second load is connected between the positive terminal of the second electrolytic capacitor and the negative terminal of the second electrolytic capacitor.

In some embodiments of the present disclosure, the first load is connected between the positive terminal of the first electrolytic capacitor and the negative terminal of the second electrolytic capacitor. The second load is connected between the positive terminal of the first electrolytic capacitor and the negative terminal of the first electrolytic capacitor.

In some embodiments of the present disclosure, each of the first power module, the second power module, and the third power module includes a first switch tube and a second switch tube connected in reverse series.

In some embodiments of the present disclosure, each of the first power module, the second power module, and the third power module includes a third switch tube and a fourth switch tube connected in reverse parallel.

In some embodiments of the present disclosure, the control unit is further configured to control the first power module, the second power module, and the third power module to make a voltage across two terminals of the first electrolytic capacitor and a voltage across two terminals of the second electrolytic capacitor be smaller than or equal to a first predetermined voltage threshold.

In some embodiments of the present disclosure, the first predetermined duration is longer than a duration required for the first electrolytic capacitor and the second electrolytic capacitor to complete charging.

In some embodiments of the present disclosure, the control unit is further configured to control, when the three-phase power is inputted to the three-phase power conversion circuit, the first controllable switch to be turned on in response to delaying for a third predetermined duration.

To achieve the above objective, the embodiments of a second aspect of the present disclosure provide the household electrical appliance including the three-phase power conversion circuit of the above embodiments.

According to the household electrical appliance of the embodiments of the present disclosure, the three-phase power conversion circuit of the above embodiments can improve the operation safety of the circuit and prevent the device in the circuit from being damaged due to overvoltage, thereby further prolonging the service life of the household electrical appliance.

To achieve the above objective, the embodiments of a third aspect of the present disclosure provide the power-on control method for the household electrical appliance. The method includes: controlling, when the three-phase power is inputted to the three-phase power conversion circuit, the first controllable switch to be turned on and controlling the three-level active PFC unit to perform conversion; and controlling, subsequent to the first predetermined duration, the second controllable switch module to be turned on, and controlling, subsequent to the second predetermined duration, the first controllable switch to be turned off to complete the power-on of the household electrical appliance.

When the power-on control method for the household electrical appliance in the above embodiments is used, firstly, when the three-phase power is inputted into the three-phase power conversion circuit, the first controllable switch in the power-on unit is controlled to be turned on, and the three-level active PFC unit is controlled to perform conversion. Subsequent to the first predetermined duration, the second controllable switch module is controlled to be turned on, and then subsequent to the second controllable switch module being turned on for the second predetermined duration, the first controllable switch is controlled to be turned off, thereby completing the power-on of the household electrical appliance. Therefore, the power-on control method for the household electrical appliance in this embodiment can improve the operation safety of the circuit and prevent the device in the circuit from being damaged due to overvoltage, thereby further prolonging the service life of the household electrical appliance.

Additional aspects and advantages of the embodiments of the present disclosure will be given at least in part in the following description, or become apparent at least in part from the following description, or can be learned from practicing of the embodiments of the present disclosure.

DETAILED DESCRIPTION OF EMBODIMENTS

Figure 1:
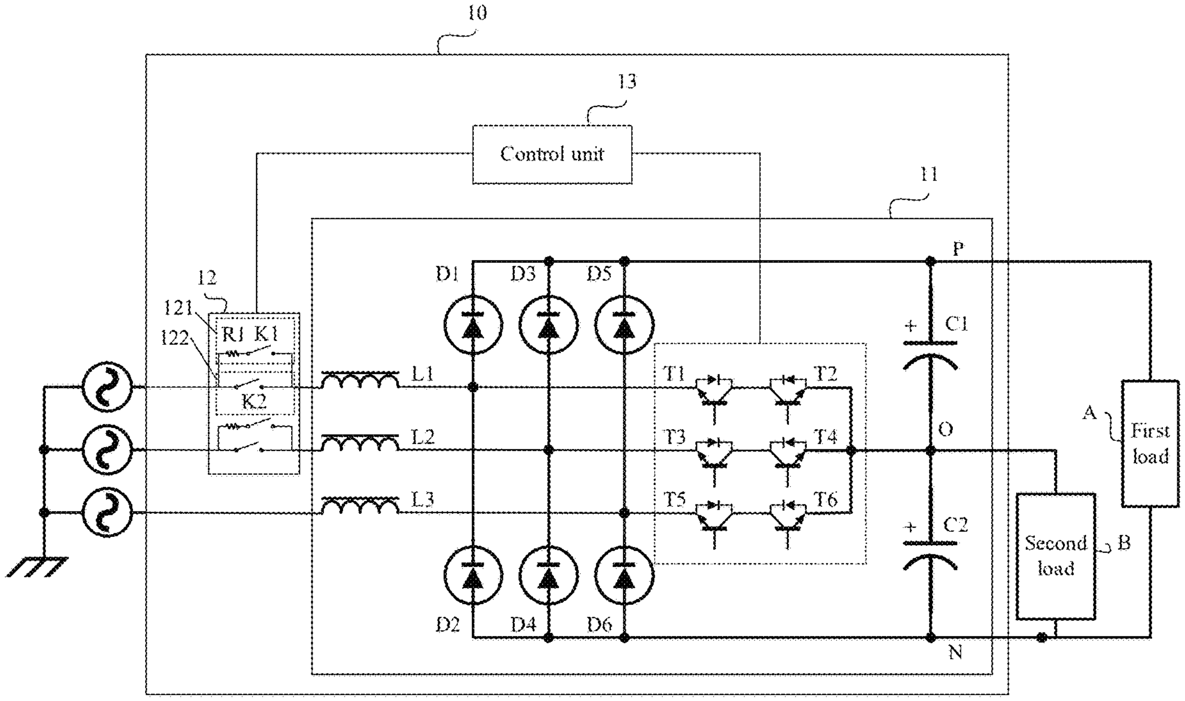
FIG. 1 is a diagram of a three-phase power conversion circuit for a household electrical appliance according to an embodiment of the present disclosure.

Embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only and intended to explain, rather than limiting, the present disclosure.

A three-phase power conversion circuit for a household electrical appliance, a household electrical appliance, and a power-on control method according to the embodiments of the present disclosure are described below with reference to the accompanying drawings.

FIG. 1 is a diagram of a three-phase power conversion circuit for a household electrical appliance according to an embodiment of the present disclosure As shown in FIG. 1, the present disclosure provides a three-phase power conversion circuit 10 for a household electrical appliance. The three-phase power conversion circuit 10 includes a three-level active Power Factor Correction (PFC) unit or circuit 11, at least two power-on units or circuits 12, and a control unit or controller 13.

The three-level active PFC unit 11 is configured to convert an inputted three-phase power to output a first Direct Current (DC) power and a second DC power through a full bus and a half bus. The first DC power is configured to supply power to a first load A of the household electrical appliance. The second DC power is configured to supply power to a second load B of the household electrical appliance. The at least two power-on units 12 are arranged corresponding to three-phase input terminals of the three-level active PFC unit 11. Each power-on unit 12 includes a first controllable switch module 121 and a second controllable switch module 122 connected in parallel. The first controllable switch module 121 includes a protection resistor R1 and a first controllable switch K1 connected in series. The control unit 13 is configured to: control, when the three-phase power is inputted to the three-phase power conversion circuit 10, the first controllable switch K1 to be turned on and control the three-level active PFC unit 11 to perform conversion; control, subsequent to a first predetermined duration, the second controllable switch module 122 to be turned on; and control, subsequent to a second predetermined duration, the first controllable switch K1 to be turned off to complete power-on of the household electrical appliance.

Figure 2:
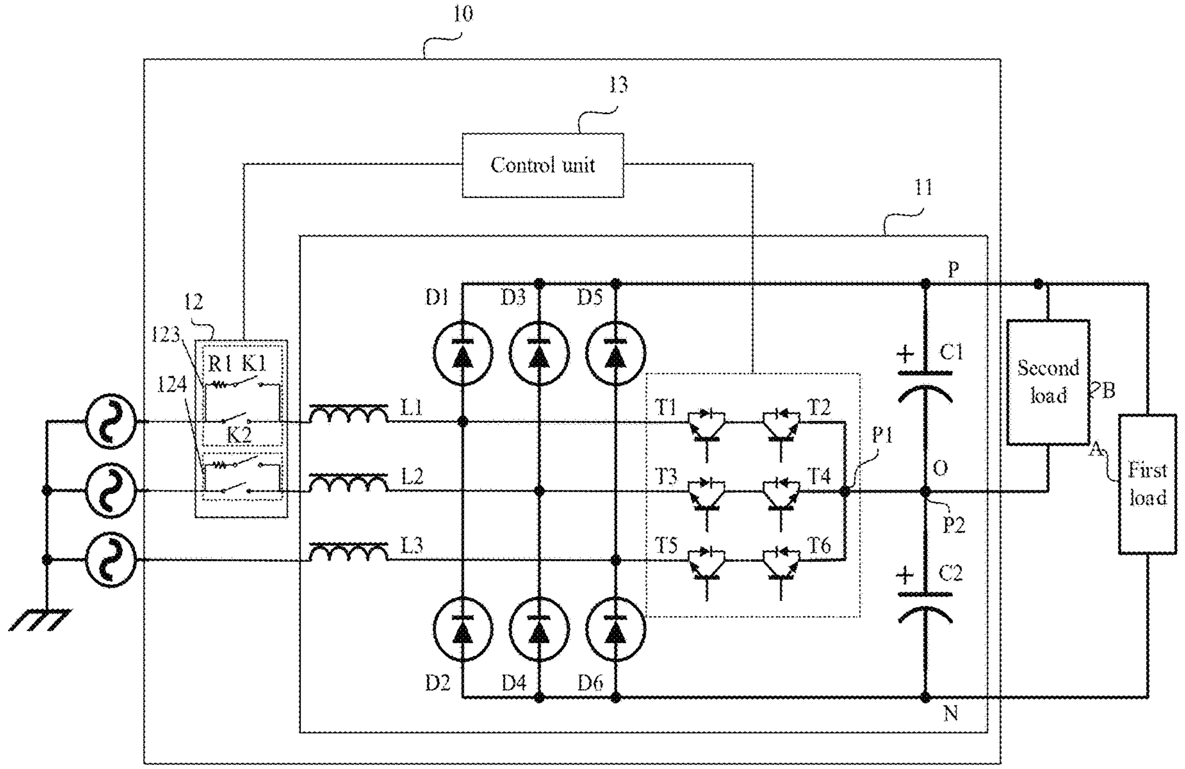
FIG. 2 is a diagram of a three-phase power conversion circuit for a household electrical appliance according to another embodiment of the present disclosure.

In an exemplary embodiment of the present disclosure, as shown in FIG. 1, the input terminals of the three-level active PFC unit 11 are provided with the three-phase power. The three-phase power, in response to entering the three-level active PFC unit 11 for processing, can output the first DC power and the second DC power from the full bus and the half bus, and supply the first DC power to the first load A of the household electrical appliance and supply the second DC power to the second load B of the household electrical appliance. It should be noted that, the first DC power may be the DC power outputted from the full bus, and the second DC power may be the DC power outputted from the half bus. That is, the first DC power is the DC power outputted between an upper half bus and a lower half bus, and the second DC power is the DC power outputted between the upper half bus and a midpoint of a DC bus or is the DC power outputted between the midpoint of the DC bus and the lower half bus. As shown in FIG. 1, the second DC power supplied to the second load B is the DC power outputted between the midpoint of the DC bus and the lower half bus. As shown in FIG. 2, the second DC power supplied to the second load B is the DC power outputted between the upper half bus and the midpoint of the DC bus.

At least two of the three-phase input terminals of the three-level active PFC unit 11 are provided with the power-on unit 12. As shown in FIG. 1, the three-phase input terminals of the three-level active PFC unit 11 are provided with two power-on units 12. Each power-on unit 12 includes the first controllable switch module 121 and the second controllable switch module 122, and the first controllable switch module 121 and the second controllable switch module 122 are connected in parallel. The first controllable switch module 121 includes the protection resistor R1 and the first controllable switch K1, and the protection resistor R1 and the first controllable switch K1 are connected in series. By controlling the first controllable switch K1, whether the protection resistor R1 is connected to the input terminals of the three-level active PFC unit 11 can be controlled. By controlling the second controllable switch module 122, whether the three-phase power is directly connected to the three-level active PFC unit 11 can be controlled. More particularly, as shown in FIG. 1, the second controllable switch module 122 in this embodiment includes the second controllable switch K2, and the first controllable switch K1 and the second controllable switch K2 are each a relay.

In some embodiments, the protection resistor R1 is a PTC resistor, i.e., a resistance of the protection resistor R1 increases with increasing temperature. In this embodiment, the control unit 13 is connected to the three-level active PFC unit 11 and the power-on unit 12. When the three-phase power is inputted to the three-phase power conversion circuit 10, the control unit 13 may first control the first controllable switch K1 to be turned on to allow the protection resistor R1 to be connected to the circuit. Since the protection resistor R1 is the PTC resistor, if the temperature rises due to excessive current or voltage in the circuit, the resistance in the circuit may be increased. Then the three-level active PFC unit 11 performs the conversion to prevent the device in the circuit from being damaged caused by instantaneous overvoltage of bus voltage, so as to ensure a normal operation of the circuit. Subsequent to the first controllable switch K1 being controlled to be turned on for the first predetermined duration, the second controllable switch K2 is controlled to be turned on, to allow the power to be directly inputted into the three-level active PFC unit 11 for performing conversion. Subsequent to the second controllable switch K2 being turned on for the second predetermined duration, the first controllable switch K1 is controlled to be turned off, to complete the power-on of the household electrical appliance.

In some embodiments of the present disclosure, as shown in FIG. 2, the at least two power-on units 12 include a first power-on unit 123 and a second power-on unit 124. The first power-on unit 123 and the second power-on unit 124 are respectively connected in series between any two-phase power of the three-phase power and corresponding two-phase input terminals of the three-phase input terminals.

In an exemplary embodiment of the present disclosure, referring to FIG. 2, this embodiment includes two power-on units, namely the first power-on unit 123 and the second power-on unit 124. Different power-on units are disposed between different phase power and corresponding input terminals of the three-phase power, to allow the power to be inputted into the three-level active PFC unit 11 in response to passing through the power-on units. It should be understood that one or three power-on units in this embodiment may also be provided.

In an embodiment of the present disclosure, the three-level active PFC unit 11 includes a first inductor L1, a second inductor L2, a third inductor L3, a three-phase rectifier bridge, a first power module, a second power module, a third power module, a first electrolytic capacitor C1, and a second electrolytic capacitor C2.

One terminal of the first inductor L1, one terminal of the second inductor L2 and one terminal of the third inductor L3 serve as three-phase input terminals respectively. A first input terminal of the three-phase rectifier bridge is connected to another terminal of the first inductor L1. A second input terminal of the three-phase rectifier bridge is connected to another terminal of the second inductor L2. A third input terminal of the three-phase rectifier bridge is connected to another terminal of the third inductor L3. One terminal of the first power module is connected to the first input terminal of the three-phase rectifier bridge. One terminal of the second power module is connected to the second input terminal of the three-phase rectifier bridge. One terminal of the third power module is connected to the third input terminal of the three-phase rectifier bridge. Another terminal of the first power module, another terminal of the second power module, and another terminal of the third power module are connected together to form a first node P1. A positive terminal of the first electrolytic capacitor C1 is connected to a first output terminal of the three-phase rectifier bridge. A negative terminal of the first electrolytic capacitor C1 is connected to a positive terminal of the second electrolytic capacitor C2 to form a second node P2. A negative terminal of the second electrolytic capacitor C2 is connected to a second output terminal of the three-phase rectifier bridge. The second node P2 is connected to the first node P1.

In an exemplary embodiment of the present disclosure, as shown in FIG. 2, the first inductor L1, the second inductor L2, and the third inductor L3 in the three-level active PFC unit 11 are configured to connect to the three-phase power. That is, one terminal of each of the first inductor L1, the second inductor L2 and the third inductor L3 may be used as one three-phase input terminal of the three-level active PFC unit 11. The three-phase power is inputted into the three-level active PFC unit 11 from the three-phase input terminals, and subsequent to the three-phase power passing through the first inductor to the third inductor, the three-phase power may enter into the three-phase rectifier bridge for rectification.

More particularly, referring to FIG. 2, the three-phase rectifier bridge includes three groups of diodes connected in parallel with each other. Each group of diodes includes two diodes connected in series in a same direction. For example, a first group of diodes includes a first diode D1 and a second diode D2. A second group of diodes includes a third diode D3 and a fourth diode D4. A third group of diodes includes a fifth diode D5 and a sixth diode D6. An anode of the first diode D1 is connected to a cathode of the second diode D2. An anode of the third diode D3 is connected to a cathode of the fourth diode D4. An anode of the fifth diode D5 is connected to a cathode of the sixth diode D6. A cathode of the first diode D1, a cathode of the third diode D3, and a cathode of the fifth diode D5 are connected together. An anode of the second diode D2, an anode of the fourth diode D4, and an anode of the sixth diode D6 are connected together.

A connection node between the first diode D1 and the second diode D2 serves as the first input terminal of the three-phase rectifier bridge, and the first input terminal is connected to another terminal of the first inductor L1. A connection node between the third diode D3 and the fourth diode D4 serves as the second input terminal of the three-phase rectifier bridge, and the second input terminal is connected to another terminal of the second inductor L2. A connection node between the fifth diode D5 and the sixth diode D6 serves as the third input terminal of the three-phase rectifier bridge, and the third input terminal is connected to another terminal of the third inductor L3.

In another exemplary embodiment of the present disclosure, the diode in this embodiment may be implemented as a fast recovery diode with a withstand voltage of 1200 V, or may be implemented as an Insulated Gate Bipolar Transistor (IGBT) with an anti-parallel diode.

The three-level active PFC unit 11 further includes first to third power modules. The first power module includes a first switch tube T1 and a second switch tube T2. The second power module includes a third switch tube T3 and a fourth switch tube T4. The third power module includes a fifth switch tube T5 and a sixth switch tube T6. More particularly, in some embodiments, the first switch tube T1 and the second switch tube T2 in the first power module are connected in reverse series. The third switch tube T3 and the fourth switch tube T4 in the second power module are connected in reverse series. The fifth switch tube T5 and the sixth switch tube T6 in the third power module are connected in reverse series. Emitters of the first switch tube T1, the third switch tube T3, and the fifth switch tube T5 are respectively connected to three input terminals of the three-phase rectifier bridge, or collectors of the third switch tube T3 and the fifth switch tube T5 are respectively connected to the three input terminals of the three-phase rectifier bridge. Emitters of the second switch tube T2, the fourth switch tube T4, and the sixth switch tube T6 are connected together to form the first node P1, or collectors of the second switch tube T2, the fourth switch tube T4, and the sixth switch tube T6 are connected together to form the first node P1.

Figure 3:
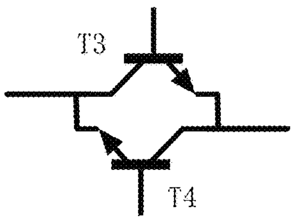
FIG. 3 is a schematic view showing a connection relationship of switch tubes in a power module according to an exemplary embodiment of the present disclosure.

In some other embodiments, as shown in FIG. 3, the two switch tubes included in each power module may be connected together in reverse parallel, i.e., the emitter of the third switch tube T3 is connected to the collector of the fourth switch tube T4, and the collector of the third switch tube T3 is connected to the emitter of the fourth switch tube T3.

It should be noted that whether it is a power module composed of two switch tubes in reverse series or a power module composed of two switch tubes in reverse parallel, the power module can be made to conduct or block bi-directionally by controlling the two switch tubes. As shown in FIG. 3, if gates of the third switch tube T3 and the fourth switch tube T4 are simultaneously provided with turn-on driving signals, the corresponding power modules can be controlled to conduct bi-directionally; and if the gates of the third switch tube T3 and the fourth switch tube T4 are simultaneously provided with turn-off driving signals, the corresponding power modules can be controlled to block bi-directionally.

In another exemplary embodiment of the present disclosure, the switch tube in this embodiment may be an IGBT with a withstand voltage of 650 V.

In some embodiments of the present disclosure, the control unit 13 is further configured to control the first power module, the second power module, and the third power module to make a voltage across two terminals of the first electrolytic capacitor C1 and a voltage across two terminals of the second electrolytic capacitor C2 be smaller than or equal to a first predetermined voltage threshold.

In this embodiment, when the switch tube is damaged in the power module, such as a switch tube is short-circuited, it is likely that the voltage is momentarily too large to cause the electrolytic capacitor to be damaged when the bus charges the first electrolytic capacitor C1 and the second electrolytic capacitor C2. Therefore, in this embodiment, the power module may be controlled first, and then the voltage across the two terminals of the first electrolytic capacitor C1 and the voltage across the two terminals of the second electrolytic capacitor C2 may be controlled, allowing the voltages to be smaller than or equal to the first predetermined voltage threshold.

Figure 4:
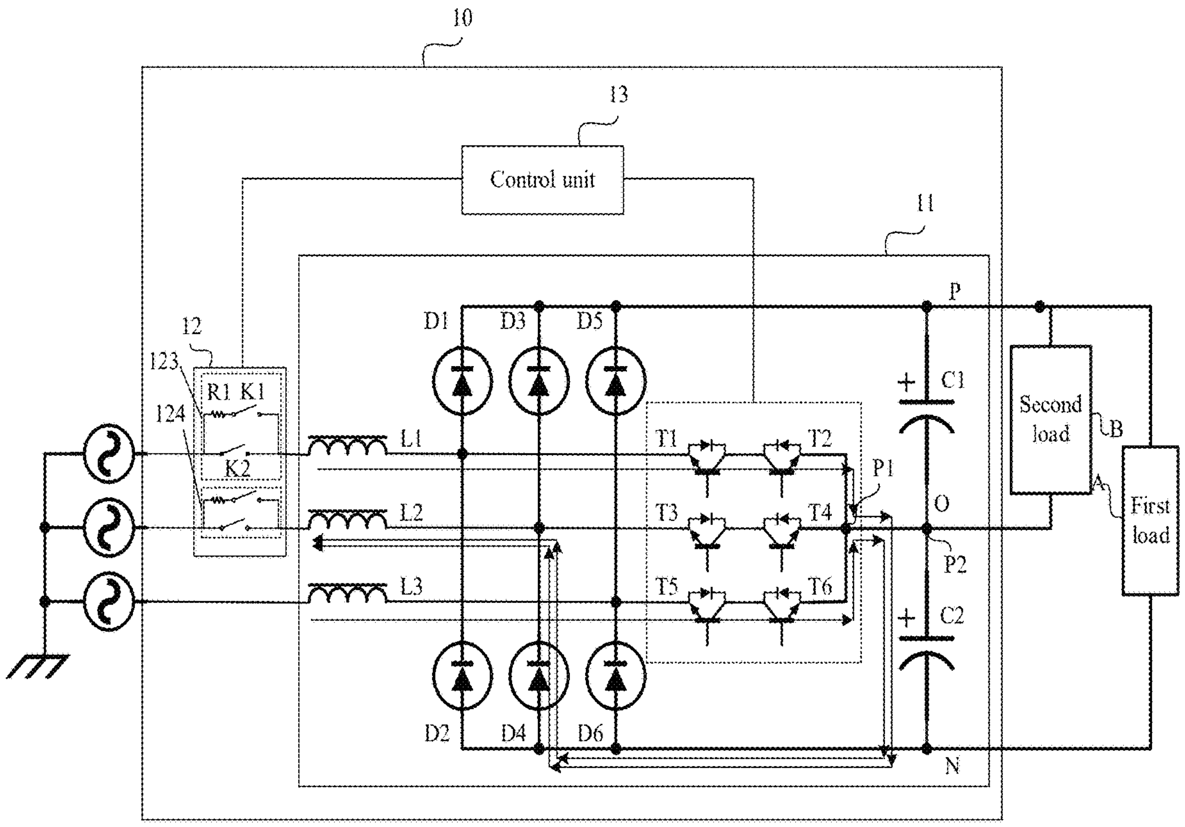
FIG. 4 is a diagram of a three-phase power conversion circuit for a household electrical appliance according to another embodiment of the present disclosure.

For example, referring to FIG. 4, when an electric quantity of the first electrolytic capacitor C1 is high enough, it is unnecessary to charge it again, then the third switch tube T3 and the fourth switch tube T4 may be controlled to be turned off, and the first switch tube T1, the second switch tube T2, the fifth switch tube T5, and the sixth switch tube T6 may be controlled to be turned on. Thus, a first-phase power may be directly inputted to the first node P1 through the first power module in response to passing through the first inductor L1, and then be inputted to the second electrolytic capacitor C2 through the second node P2, and then flow back from the fourth diode D4. The third-phase power, in response to passing through the third inductor L3, may be directly inputted to the first node P1 through the third power module, then inputted to the second electrolytic capacitor C2 through the second node P2, and then flow back from the fourth diode D4. Therefore, only the second electrolytic capacitor C2 is charged to allow the voltage across the two terminals of the first electrolytic capacitor C1 and the voltage across the two terminals of the second electrolytic capacitor C2 to be controlled to be smaller than the first predetermined voltage threshold. In other embodiments, the first predetermined voltage threshold ranges from 300 V to 500 V.

In some embodiments of the present disclosure, the first predetermined duration is longer than a duration required for the first electrolytic capacitor and the second electrolytic capacitor to complete charging. In some embodiments, the control unit 13 is further configured to control, when the three-phase power is inputted to the three-phase power conversion circuit 10, the first controllable switch K1 to be turned on in response to delaying for a third predetermined duration.

Figure 5:
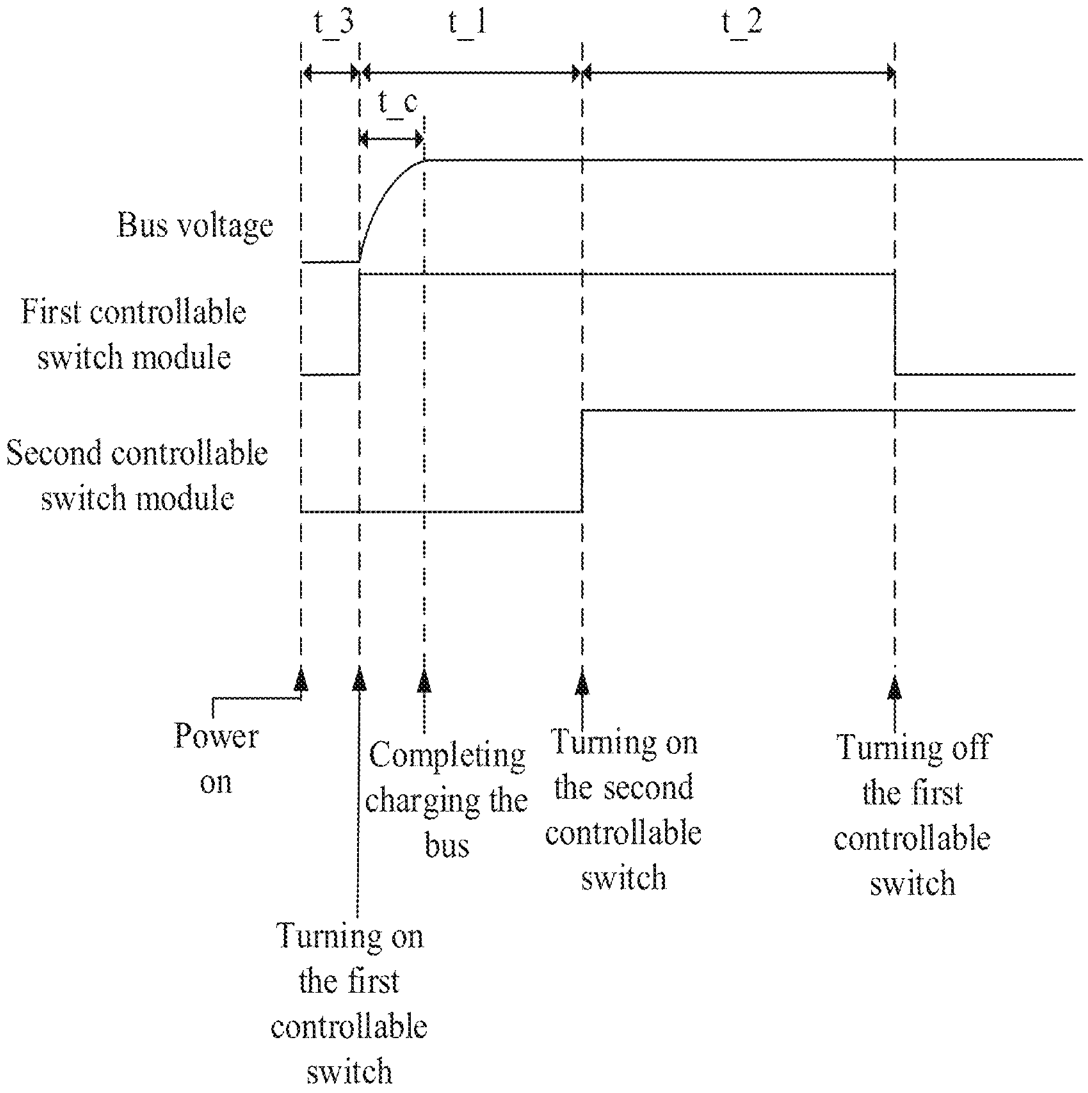
FIG. 5 is a schematic view showing control signals in a three-phase power conversion circuit according to an embodiment of the present disclosure.

In an exemplary embodiment of the present disclosure, referring to FIG. 1 and FIG. 5, when the three-phase power is inputted into the three-phase power conversion circuit 10, the first controllable switch K1 is controlled to be turned on in response to delaying for the third predetermined duration t_3, and then the first electrolytic capacitor C1 and the second electrolytic capacitor C2 in the bus are charged to increase a bus voltage. The duration required for the first electrolytic capacitor C1 and the second electrolytic capacitor C2 to complete charging is t_c. Subsequent to the first controllable switch being turned on for the first predetermined duration t_1, the second controllable switch K2 is controlled to be turned on. The first predetermined duration t_1 is longer than the duration t_c required for the first electrolytic capacitor C1 and the second electrolytic capacitor C2 to complete charging. Then the first controllable switch K1 is controlled to be turned off subsequent to the second controllable switch K2 being turned on for the second predetermined duration t_2. As can be seen from FIG. 5, subsequent to the first controllable switch K1 is turned on and the second controllable switch K2 is turned on, the bus voltage rises slowly and does not cause damage to the electrolytic capacitor.

In summary, the three-phase power conversion circuit for the household electrical appliance according to the embodiments of the present disclosure can improve the operation safety of the circuit and prevent the device in the circuit from being damaged due to overvoltage, thereby further prolonging the service life of the circuit.

Figure 6:
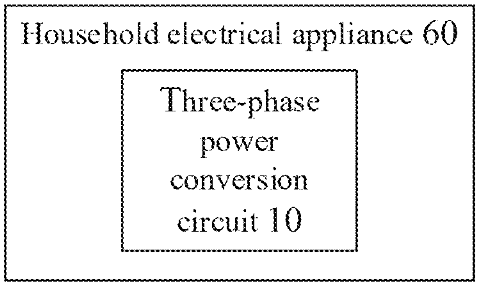
FIG. 6 is a structural block diagram of a household electrical appliance according to an embodiment of the present disclosure.

FIG. 6 is a block diagram of a household electrical appliance according to an embodiment of the present disclosure.

Further, as shown in FIG. 6, the present disclosure provides a household electrical appliance 60 including the three-phase power conversion circuit 10 of the above embodiments.

In the household electrical appliance according to the embodiments of the present disclosure, the three-phase power conversion circuit of the above embodiments can improve the operation safety of the circuit and prevent the device in the circuit from being damaged due to overvoltage, thereby further prolonging the service life of the household electrical appliance.

Figure 7:
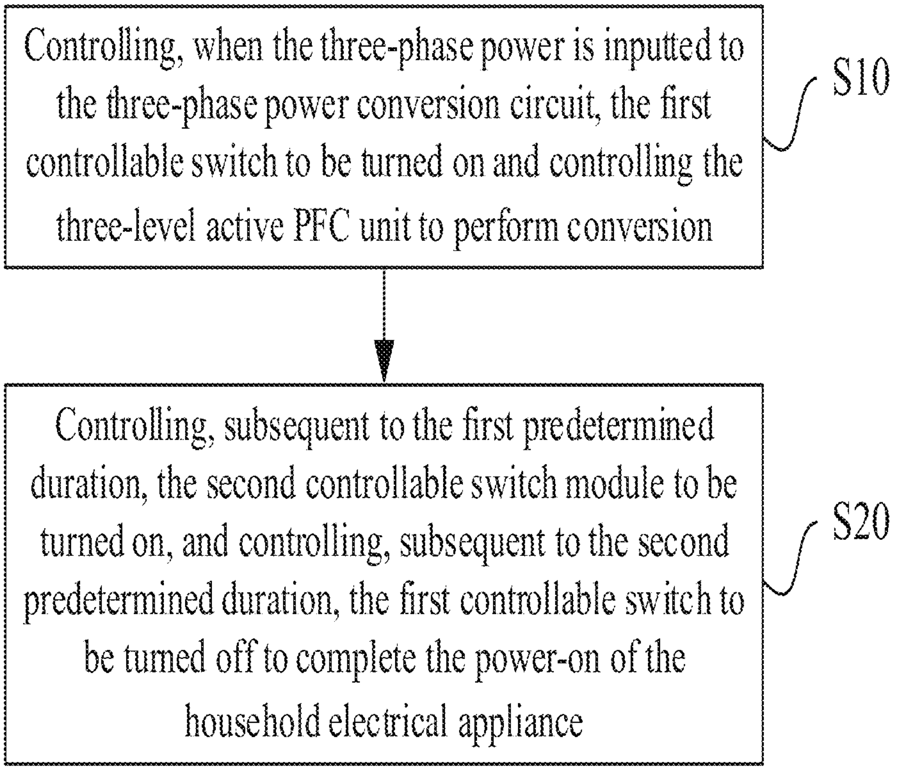
FIG. 7 is a flowchart of a power-on control method for a household electrical appliance according to an embodiment of the present disclosure.

FIG. 7 is a flowchart of a power-on control method for a household electrical appliance according to an embodiment of the present disclosure.

Further, as shown in FIG. 7, the present disclosure provides the power-on control method applied to the household electrical appliance in the above embodiments, the method includes operations at blocks.

At block S10, when the three-phase power is inputted to the three-phase power conversion circuit, the first controllable switch is controlled to be turned on, and the three-level active PFC unit is controlled to perform conversion.

At block S20, subsequent to the first predetermined duration, the second controllable switch module is controlled to be turned on, and subsequent to the second predetermined duration, the first controllable switch is controlled to be turned off to complete the power-on of the household electrical appliance.

It should be noted that, for the specific implementation mode of the power-on control method for the household electrical appliance in the embodiments of the present disclosure, reference may be made to relevant descriptions of the working principle of the three-phase power conversion circuit in the above embodiments, and the details are omitted here.

To sum up, the power-on control method for the household electrical appliance in this embodiment can improve the operation safety of the circuit and prevent the device in the circuit from being damaged due to overvoltage, thereby further prolonging the service life of the household electrical appliance.

In addition, it should be noted that the present disclosure may further provide a computer-readable storage medium storing a power-on control program for a household electrical appliance corresponding to the power-on control method for the household electrical appliance in the above embodiments. By executing the power-on control program for the household electrical appliance by a processor, the operation safety of the circuit can be improved, and the device in the circuit can be prevented from being damaged due to overvoltage, thereby prolonging the service life of the household electrical appliance.

It should be noted that the logics and/or steps represented in the flowchart or described otherwise herein can be, for example, considered as a list of ordered executable instructions for implementing logic functions, and can be embodied in any computer-readable medium that is to be used by or used with an instruction execution system, apparatus, or device (such as a computer-based system, a system including a processor, or any other system that can retrieve and execute instructions from an instruction execution system, apparatus, or device). For the present disclosure, a "computer-readable medium" can be any apparatus that can contain, store, communicate, propagate, or transmit a program to be used by or used with an instruction execution system, apparatus, or device. More specific examples (a non-exhaustive list) of computer-readable mediums include:

an electrical connector (electronic device) with one or more wirings, a portable computer disk case (magnetic devices), a Random Access Memory (RAM), a Read Only Memory (ROM), an Erasable Programmable Read Only Memory (EPROM or flash memory), a fiber optic device, and a portable Compact Disk Read Only memory (CDROM). In addition, the computer-readable medium may even be a piece of paper or other suitable medium on which the program can be printed, as the program can be obtained electronically, e.g., by optically scanning the paper or another medium, and then editing, interpreting, or otherwise processing the scanning result when necessary, and then stored in a computer memory.

It should be understood that each part of the present disclosure can be implemented in hardware, software, firmware, or any combination thereof. In the above embodiments, a number of steps or methods can be implemented using software or firmware stored in a memory and executed by a suitable instruction execution system. For example, when implemented in hardware, as in another embodiment, it can be implemented by any one or combination of the following technologies known in the art: a discrete logic circuit having logic gate circuits for implementing logic functions on data signals, an application-specific integrated circuit with suitable combined logic gates, a Programmable Gate Array (PGA), a Field Programmable Gate Array (FPGA), etc.

In descriptions of the present disclosure, descriptions with reference to the terms "an embodiment", "some embodiments", "examples", "specific examples", or "some examples" etc., mean that specific features, structure, materials, or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner.

In descriptions of the present disclosure, it should be understood that the orientation or the position indicated by terms such as "center", "longitudinal", "lateral", "length", "width", "thickness", "over", "below", "front", "rear", "left", "right", "vertical", "horizontal", "top", "bottom", "inner", "outer", "clockwise", "anti-clockwise"", "axial", "radial", and "circumferential" should be construed to refer to the orientation and the position as shown in the drawings in discussion, and is only for the convenience of describing the present disclosure and simplifying the description, rather than indicating or implying that the pointed device or element must have a specific orientation, or be constructed and operated in a specific orientation, and therefore cannot be understood as a limitation of the present disclosure.

In addition, terms "first", "second", and the like used in the embodiments of the present disclosure are only for descriptive purposes, and cannot be understood as indicating or implying relative importance or implicitly indicating the number of the indicated technical features. Therefore, the features associated with "first" and "second" may explicitly or implicitly include at least one of the features. In the description of the present disclosure, "plurality" means at least two, such as two, three, four, unless otherwise specifically defined.

In the present disclosure, unless otherwise clearly specified and limited, terms such as "install", "connect", "connect to", "fix" and the like should be understood in a broad sense. For example, it may be a fixed connection or a detachable connection or connection as one piece; mechanical connection or electrical connection; direct connection or indirect connection through an intermediate; internal communication of two components or the interaction relationship between two components. For those skilled in the art, the specific meaning of the above-mentioned terms in the present disclosure can be understood according to specific circumstances.

In the present disclosure, unless expressly stipulated and defined otherwise, the first feature "on" or "under" the second feature may mean that the first feature is in direct contact with the second feature, or the first and second features are in indirect contact through an intermediate. Moreover, the first feature "above" the second feature may mean that the first feature is directly above or obliquely above the second feature, or simply mean that a level of the first feature is higher than that of the second feature. The first feature "below" the second feature may mean that the first feature is directly below or obliquely below the second feature, or simply mean that the level of the first feature is smaller than that of the second feature.

Although embodiments of the present disclosure have been shown and described above, it should be understood that the above embodiments are merely exemplary, and cannot be construed as limitations of the present disclosure. For those skilled in the art, changes, modifications, alternatives and variants can be made to the above embodiments without departing from the scope of the present disclosure.

What is claimed is:

1. A three-phase power conversion circuit for a household electrical appliance, comprising:

a three-level active Power Factor Correction (PFC) circuit configured to convert an inputted three-phase power to output a first Direct Current (DC) power and a second DC power through a full bus and a half bus, wherein the first DC power is configured to supply power to a first load of the household electrical appliance, and the second DC power is configured to supply power to a second load of the household electrical appliance;

at least two power-on circuits arranged corresponding to three-phase input terminals of the three-level active PFC circuit, wherein each of the at least two power-on circuits comprises a first controllable switch module and a second controllable switch module connected in parallel, and the first controllable switch module comprises a first controllable switch; and a controller configured to:

control, when the three-phase power is inputted to the three-phase power conversion circuit, the first controllable switch to be turned on, and control the three-level active PFC circuit to perform conversion;

control, subsequent to a first predetermined duration, the second controllable switch module to be turned on; and control, subsequent to a second predetermined duration, the first controllable switch to be turned off to complete power-on of the household electrical appliance.

2. The three-phase power conversion circuit according to claim 1, wherein:

the second controllable switch module comprises a second controllable switch; and the first controllable switch and the second controllable switch are each a relay.

3. The three-phase power conversion circuit according to claim 2, wherein the first controllable switch module further comprises a protection resistor connected in series to the first controllable switch, and the protection resistor comprises a PTC resistor.

4. The three-phase power conversion circuit according to claim 1, wherein the at least two power-on circuits comprise a first power-on circuit and a second power-on circuit, the first power-on circuit and the second power-on circuit being respectively connected in series between any two-phase power of the three-phase power and corresponding two-phase input terminals of the three-phase input terminals.

5. The three-phase power conversion circuit according to claim 4, wherein the three-level active PFC circuit comprises:

a first inductor, a second inductor, and a third inductor, one terminal of the first inductor, one terminal of the second inductor, and one terminal of the third inductor serving as the three-phase input terminals respectively.

6. The three-phase power conversion circuit according to claim 5, wherein the three-level active PFC circuit further comprises:

a three-phase rectifier bridge having a first input terminal connected to another terminal of the first inductor, a second input terminal connected to another terminal of the second inductor, and a third input terminal connected to another terminal of the third inductor.

7. The three-phase power conversion circuit according to claim 6, wherein the three-level active PFC circuit further comprises:

a first power module, a second power module, and a third power module, one terminal of the first power module being connected to the first input terminal of the three-phase rectifier bridge, one terminal of the second power module being connected to the second input terminal of the three-phase rectifier bridge, one terminal of the third power module being connected to the third input terminal of the three-phase rectifier bridge, and another terminal of the first power module, another terminal of the second power module, and another terminal of the third power module being connected to form a first node.

8. The three-phase power conversion circuit according to claim 7, wherein the three-level active PFC circuit further comprises:

a first electrolytic capacitor and a second electrolytic capacitor, a positive terminal of the first electrolytic capacitor being connected to a first output terminal of the three-phase rectifier bridge, a negative terminal of the first electrolytic capacitor being connected to a positive terminal of the second electrolytic capacitor to form a second node connected to the first node, and a negative terminal of the second electrolytic capacitor being connected to a second output terminal of the three-phase rectifier bridge.

9. The three-phase power conversion circuit according to claim 8, wherein:

the first load is connected between the positive terminal of the first electrolytic capacitor and the negative terminal of the second electrolytic capacitor; and the second load is connected between the positive terminal of the second electrolytic capacitor and the negative terminal of the second electrolytic capacitor.

10. The three-phase power conversion circuit according to claim 8, wherein:

the first load is connected between the positive terminal of the first electrolytic capacitor and the negative terminal of the second electrolytic capacitor; and the second load is connected between the positive terminal of the first electrolytic capacitor and the negative terminal of the first electrolytic capacitor.

11. The three-phase power conversion circuit according to claim 8, wherein each of the first power module, the second power module and the third power module comprises a first switch tube and a second switch tube connected in reverse series.

12. The three-phase power conversion circuit according to claim 11, wherein each of the first power module, the second power module and the third power module comprises a third switch tube and a fourth switch tube connected in reverse parallel.

13. The three-phase power conversion circuit according to claim 8, wherein the controller is further configured to control the first power module, the second power module, and the third power module to make a voltage across two terminals of the first electrolytic capacitor and a voltage across two terminals of the second electrolytic capacitor be smaller than or equal to a first predetermined voltage threshold.

14. The three-phase power conversion circuit according to claim 8, wherein the first predetermined duration is longer than a duration required for the first electrolytic capacitor and the second electrolytic capacitor to complete charging.

15. The three-phase power conversion circuit according to claim 1, wherein the controller is further configured to control, when the three-phase power is inputted to the three-phase power conversion circuit, the first controllable switch to be turned on in response to delaying for a third predetermined duration.

16. A household electrical appliance comprising the three-phase power conversion circuit according to claim 1.

17. A power-on control method for a household electrical appliance according to claim 16, the method comprising:

controlling, when the three-phase power is inputted to the three-phase power conversion circuit, the first controllable switch to be turned on and controlling the three-level active PFC circuit to perform conversion; and controlling, subsequent to the first predetermined duration, the second controllable switch module to be turned on, and controlling, subsequent to the second predetermined duration, the first controllable switch to be turned off to complete the power-on of the household electrical appliance.

* * * * *